(12) United States Patent
Anderson

(10) Patent No.: US 6,594,370 B1
(45) Date of Patent: *Jul. 15, 2003

(54) WIRELESS PERSONAL COMMUNICATION APPARATUS IN THE FORM OF A NECKLACE

(76) Inventor: James C. Anderson, 40 Aran Rd., Westwood, MA (US) 02090

( * ) Notice: Subject to any disclaimer, the term of this patent is extended or adjusted under 35 U.S.C. 154(b) by 0 days.

This patent is subject to a terminal disclaimer.

(21) Appl. No.: 09/617,604

(22) Filed: Jul. 15, 2000

Related U.S. Application Data

(60) Provisional application No. 60/144,558, filed on Jul. 16, 1999, and provisional application No. 60/144,593, filed on Jul. 16, 1999.

(51) Int. Cl.$^7$ .................. H04R 25/00; H04R 19/04; A61F 11/06; H04B 5/00
(52) U.S. Cl. .................. 381/315; 381/71.6; 381/364; 381/367; 381/79
(58) Field of Search .................. 381/315, 716, 381/79, 364, 367

(56) References Cited

U.S. PATENT DOCUMENTS

| | | | | |
|---|---|---|---|---|
| 4,376,281 A | * | 3/1983 | Smith | 343/768 |
| 4,662,378 A | * | 5/1987 | Thomis | 128/644 |
| 5,374,940 A | * | 12/1994 | Corio | 345/1 |
| 5,563,951 A | * | 10/1996 | Wang et al. | 381/24 |
| 5,646,635 A | * | 7/1997 | Cockson et al. | 343/702 |
| 5,711,246 A | * | 1/1998 | Yano et al. | 119/51.02 |
| 5,721,783 A | * | 2/1998 | Anderson | 381/68.6 |
| 5,726,660 A | * | 3/1998 | Purdy et al. | 342/357 |
| 5,751,260 A | * | 5/1998 | Nappi et al. | 345/158 |
| 5,757,929 A | * | 5/1998 | Wang et al. | 381/24 |
| 5,793,875 A | * | 8/1998 | Lehr et al. | 381/68.1 |
| 5,798,733 A | * | 8/1998 | Ethridge | 342/357 |
| 5,818,328 A | * | 10/1998 | Anderson et al. | 381/79 |
| 5,881,159 A | * | 3/1999 | Aceti et al. | 381/328 |
| 5,905,473 A | * | 5/1999 | Taenzer | 343/834 |
| 5,956,330 A | * | 9/1999 | Kerns | 370/336 |
| 6,021,207 A | * | 2/2000 | Puthuff et al. | 381/330 |

OTHER PUBLICATIONS

Thiele et al., FD–TD Analysis of Vivaldi Flared Horn Antennas and Arrays, May 5, 1994, IEEE, vol. 42, No. 5, pp. 633–641.*

Legg, RFID tags and gain flexibility, Jun. 19, 1997, EDN, p. 18.*

* cited by examiner

*Primary Examiner*—Minsun Oh Harvey
*Assistant Examiner*—Laura A. Grier
(74) *Attorney, Agent, or Firm*—Richard F. Benway

(57) ABSTRACT

A wireless personal communication system includes an earpiece, worn in or behind the ear, that communicates wirelessly with a remote processor unit (RPU) worn at the neck. The RPU is a wearable computer in the form of a necklace, neck ribbon, collar or other flat, flexible article that may be worn under clothing to hide it from view. The close proximity of the earpiece to the RPU, combined with the large antenna aperture area available in this RPU form, enables the use of radar technology to implement a two-way wireless link between the earpiece and RPU, and also allows earpiece operating power to be beamed from the RPU. The resulting size and cost reductions in both the earpiece and RPU allow the manufacture of disposable hearing aids and, when the RPU is equipped with secondary wireless link circuitry, cellular telephones and pagers.

12 Claims, 2 Drawing Sheets

WIRELESS PERSONAL COMMUNICATION APPARATUS IN THE FORM OF A NECKLACE

PRIORITY

Priority is claimed based on Provisional Applications U.S. PTO No. 60/144,558, "Wireless Personal Communication Apparatus in the Form of a Necklace," filed Jul. 16, 1999 and Ser. No. 60/144,593, "Compact Antenna System for Reflective Wireless Personal Communication," filed Jul. 16, 1999.

BACKGROUND OF THE INVENTION

1. Field of the Invention

The present invention is directed to wireless personal communication devices, and in particular to a wireless communication system comprising one or more earpieces worn at the ear(s) that communicate wirelessly with a remote processing unit, or RPU, worn at the neck of a user. Such systems have application in the area of heating aids and wearable computers. The earpiece(s) and RPU may in turn communicate with other peripheral and control equipment, such as a display worn on the wrist like a watch, as well as standard public-access cellular telephone and paging systems.

2. Brief Description of the Related Art

In the prior art, U.S. Pat. No. 5,721,783 describes a hearing aid with wireless remote processor that uses reflective, or "modulated backscatter," radar technology to implement a wireless link between an RPU and one or more earpieces. In that implementation, the RPU is also described as supplying beamed power to the earpiece(s), thus reducing or eliminating the need for bulky, expensive earpiece batteries. However, the RPU described in U.S. Pat. No. 5,721,783 is intended to be "worn as a wristwatch or other inconspicuous piece of jewelry, carried in a pocket or a purse, or worn on a belt over or under clothing." An RPU in the form of flat, flexible neckwear that would provide a large antenna aperture while hidden from view is not described in U.S. Pat. No. 5,721,783.

A typical form factor for the RPU of the invention described in U.S. Pat. No. 5,721,783 is a body-worn unit roughly the size of a standard PCMCIA (Personal Computer Memory Card International) Type III PC Card having 54 mm (2.13 inches) width, 85.6 mm (3.37 inches) length and 10.5 mm (0.41 inch) height. Within this volume, and at an operating frequency of 6 GHz where a quarter wavelength is 12.7 mm (0.5 inch), it is possible to place an antenna system comprising four quarter-wavelength end-fed driven elements along the width of the RPU and away from the user's body. These driven elements may reside within a pair of elliptical quarter-cylinder cavity reflector sections (known in the art as "Quarter Round" or "Ovolo" shapes), with end reflectors, placed side-by-side and separated by a center reflector. The four driven elements, only one of which radiates at any given time, are positioned in the left or right cavity as the left or right element. Diversity switching, a technique well known in the art, is then used to establish the best choice of elements for transmitting an interrogation and receiving a reply (see, e.g., International Publication No. WO 98/44591 and its counterpart U.S. Pat. No. 5,905,473). Even with an optimum driven element choice, this antenna system is still subject to interference due to blockage from the user's arms (also known in the art as "shadowing"), and may not be capable of providing an acceptably reliable communication link at all times if worn at the belt. If worn about the neck, this prior art RPU is conspicuous, and may still be subject to blockage as the user's head turns. Furthermore, the maximum antenna aperture area available from one end of such an RPU is at most a few square centimeters (less than one square inch), which may be inadequate for many beamed-power applications. By contrast, the RPU antenna of the present invention has a comparatively large area to provide a much greater antenna aperture and gain than reflector designs used in the prior art, and is much less subject to blockage because it provides multiple driven elements distributed about the neck, where it can be worn inconspicuously.

Soft, flexible radio frequency identification (RFID) tags are well known in the art (see, e.g., U.S. Pat. No. 5,711,246). Low-cost, battery-free RFID tags that use 2.4 GHz "folded dipole" printed antennas and electronic transponders embedded in flexprint (a form of flat, flexible printed circuit material well known in the art), along with beamed-power and reflective communication technology, are already in widespread use (see, e.g., "RFID tags shrink and gain flexibility," EDN Magazine, Jun. 19, 1997, p. 18). Although the earpieces associated with the present invention preferably use such tag/transponder technology, the flexprint manufacturing techniques are newly, applied to the conformal necklace RPU that contains an interrogator/illuminator rather than a tag/transponder.

The types of antennas required for the necklace RPU are well known in the prior art, including electronically steered flat antenna arrays for forming the pencil beam used in beamed-power applications (U.S. Pat. No. 4,376,281) and flexible printed circuit antennas that operate at 5.8 GHz (U.S. Pat. No. 5,646,635).

Although wearable computers are well known in the prior art examples are found in U.S. Pat. Nos. 5,726,660, 5,751,260 and 5,798,733), none use an RPU in the form of a necklace.

Although many necklaces are used in body monitoring, wireless hearing aid and other audio applications, none are known to provide bi-directional communication capability between the necklace and one or more earpieces (see, e.g., U.S. Pat. Nos. 4,662,378, 5,563,951, 5,757,929, 5,793,875 and 5,818,328)

Disposable hearing aids have recently been, introduced (U.S. Pat. No. 5,881,159), but do not involve wireless technology. Wireless hearing aid and communication system earpieces known in the prior art (e.g., U.S. Pat. No. 6,021, 207) are not so inexpensive as to be disposable.

SUMMARY OF THE INVENTION

It is an object of the present invention to provide a new, improved form factor for a remote processor unit (RPU) that is functionally similar to the RPU of U.S. Pat. No. 5,721, 783, entitled "Hearing Aid with Wireless Remote Processor," issued on Feb. 24, 1998, to James C. Anderson. In the present invention, the RPU is generally in the form of a necklace, neck ribbon, neckband, neck drape, necklet, stole, collar, collar insert, bandoleer or other neckwear. This new form factor enables the manufacture of low-cost, "printable" and disposable wireless hearing aids, cellular telephones, pagers and wearable computer systems.

The present invention is concerned with improvements in the RPU portion, not the earpiece portion, of a wireless personal communication system. Similar earpieces may generally be used without regard to whether the RPU is in the form of a necklace or a belt-worn unit. Size and cost reduction techniques for earpieces, resulting from the use of beamed power and reflective technologies, have already been described in U.S. Pat. No. 5,721,783, and are therefore not an object of the present invention.

It is an object of the present invention to provide numerous advantages over the traditional belt-worn RPU. Whereas RF path link losses from a belt-worn RPU may be tremendous due to body blockage (e.g., from the user's arms and stomach) or other transmission path blockages (e.g., a table top in the path between the RPU and earpiece) the necklace approach of the present invention minimizes the probability of such obstructions. The shorter distance between necklace RPU transmitting elements and target earpieces, combined with the lower probability of obstructions, allows lower-power operation, longer battery life, reduced generation of interference to other equipment, reduced susceptibility to interference from other equipment, substantial improvement in operational reliability, and enables the use of beamed-power and reflective technologies for the associated earpieces. Although it is not required that beamed power nor reflective technologies be used in the present invention (i.e., the RPU, earpieces and other peripheral devices may all contain batteries and "active" non-reflective transmitters), such technologies are preferred as they maximize the benefit of this invention in the overall system. When worn under clothing, the necklace RPU is less conspicuous than a belt-worn RPU, yet provides a considerably larger antenna aperture than would be practical with a typical belt-worn RPU in the prior art.

It is an object of the present invention to provide a "printable" flexprint approach to necklace RPU fabrication, resulting in a substantial cost savings for a "disposable" design, due in part to the elimination of "touch labor" during manufacture (see, e.g., Stephan Ohr, "Technologists define future cellular components," Electronic Engineering Times Newspaper, Nov. 16, 1998, pp. 45–48). Although the necklace RPU could be formed from a single piece of material such as Rogers Corp. "Duroid", it is preferably fabricated using flexprint material such as "FlexTenna" from LaBarge, Inc. When the RPU electronics are encased within the material, the entire necklace can be wiped clean with a damp cloth, or the unit can be worn inside a separate, washable cloth cover.

It is an object of the present invention that some embodiments may make use of the proximity of the necklaces with the user's skin to perform pulse rate, temperature or resistivity measurements. A throat microphone or a variety of microphone array elements may also be added to enhance system performance. Optional secondary wireless"link circuitry may be added, along with the necessary printed antennas, to perform pager and messaging functions and cell phone functions are possible when an extra battery unit is wired to the necklace RPU.

It is an object of this invention to control system operation through the use of voice recognition and response, based directly on information contained in the user's ambient audio environment. It is a further object of this invention to control system operation using other input devices located directly on the necklace RPU. Elastomeric pushbutton switches may be used as input devices, and al pens" or "finger touch" alphanumeric input devices may be used as well (see, e.g., Bruce Trunck, "lntegrating Digital Pens and Finger Touch," Electronic Design Magazine, Dec. 16, 1995, pp. 98–104). Another object of this invention is to control system operation using devices that are separate from the necklace RPU but communicate with the necklace via wired or wireless means. A wrist watch control panel, for example, may communicate wirelessly with the necklace RPU using reflective technology and a data format similar to that used by the earpieces, or may work using an entirely different format such as "Bluetooth". Similarly, a control panel in the form of a credit card size "personal organizer" can also be used.

DESCRIPTION OF THE DRAWINGS

These and other objects, features and advantages of the invention, will best be understood with the aid of the following detailed description in conjunction with the accompanying drawings in which.

DESCRIPTION OF THE PREFERRED EMBODIMENTS

Figure 1:
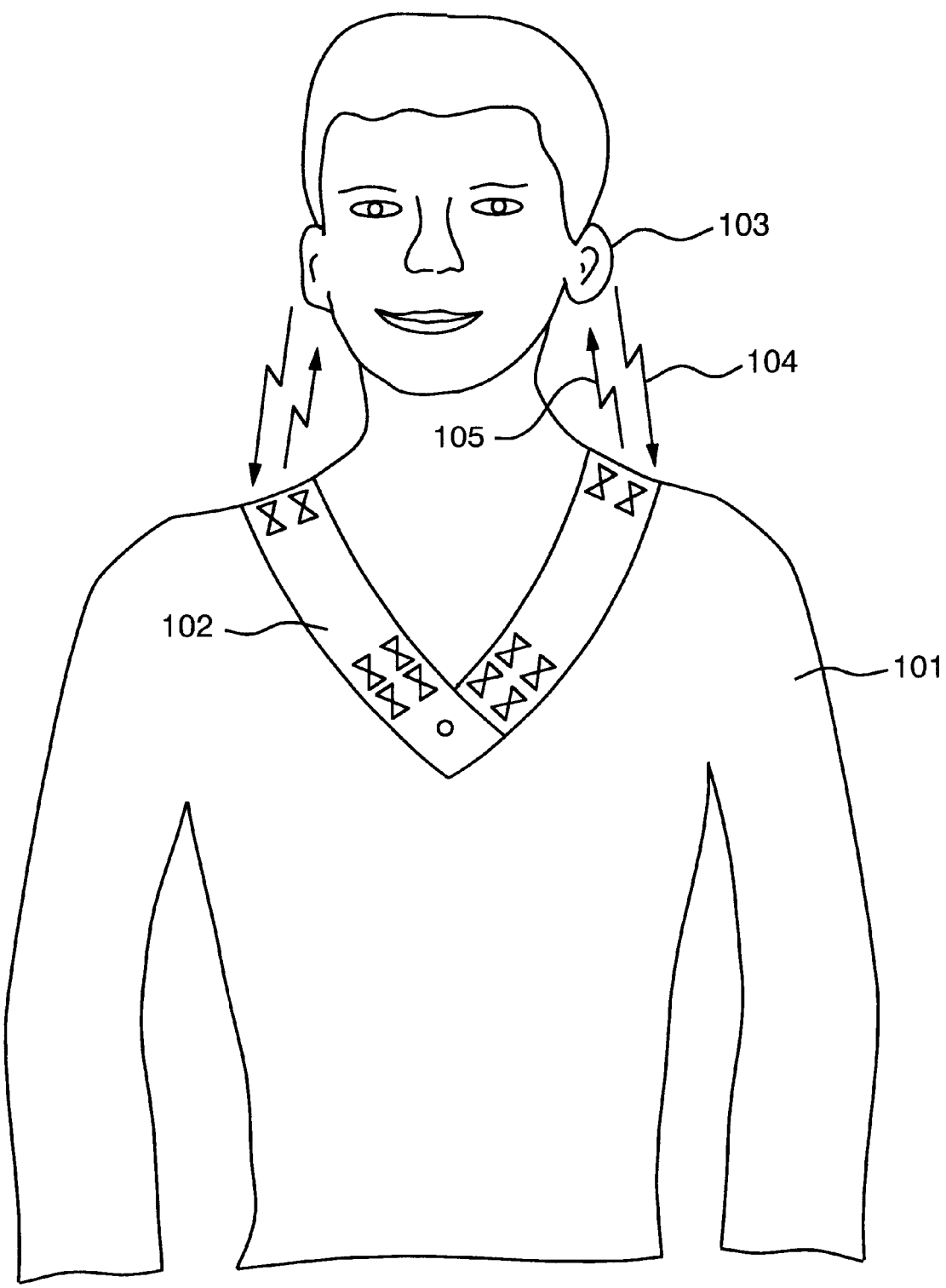
FIG. 1 is the frontal view of a user, wearing the wireless personal communication apparatus in the form of a necklace.

1. Neck ribbon. FIG. 1 depicts the frontal view of a user 101 of the wireless personal communication apparatus in the form of a necklace 102 wherein the necklace is a flat, flexible neck ribbon that is preferably worn inconspicuously underneath clothing. The remote processor unit (RPU) in the necklace wirelessly communicates with one or more earpieces that can be hidden behind the ear or in the ear canal. In FIG. 1, the user 101 has an earpiece worn at the left ear 103. Sounds from the environment are picked up by a microphone in the earpiece 103 and transmitted to the necklace 102 via wireless link 104 for enhancements such as noise cancellation and directionality improvement. The enhanced signal is then sent from the necklace 102 back to the earpiece 103 via wireless link 105, and this same wireless link 105 may also be used to beam operating power from the necklace 102 to the earpiece 103. Wireless communication from the earpiece 103 to the necklace 102 is preferably accomplished using "modulated backscatter," wherein a portion of the power beamed from the necklace 102 to the earpiece 103 is modulated and reflected by the earpiece 103 back to the necklace 102 via wireless link 104.

Figure 2:
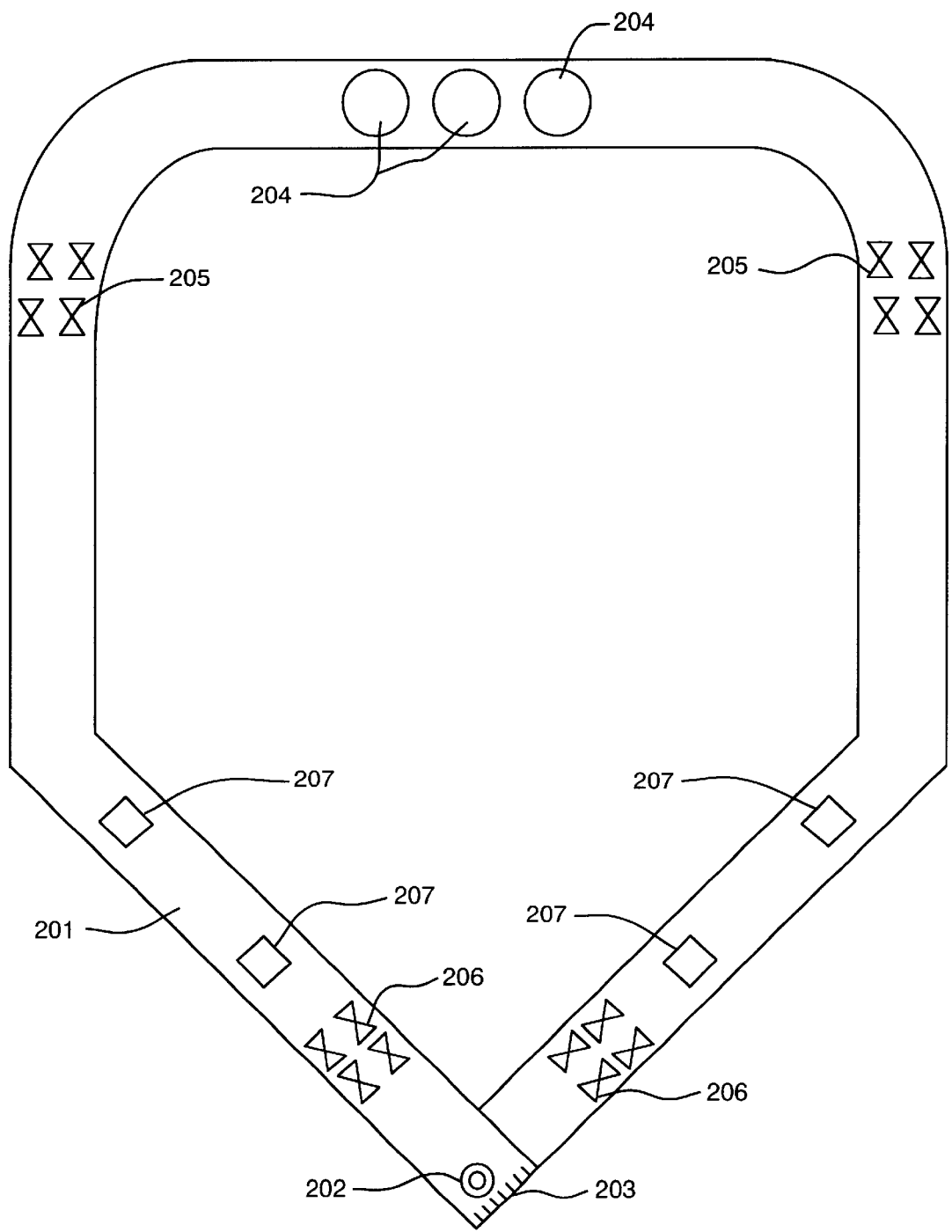
FIG. 2 is a mechanical drawing of the wireless personal communication apparatus in the form of a necklace.

FIG. 2 provides a more detailed mechanical drawing of the invention. The necklace 201 is preferably in the form of a flexprint (flat, flexible printed circuit) strip that may be worn inconspicuously under clothing. The necklace is fastened in front with a snap 202 to facilitate easy removal. Once removed from the user's neck, the electronic components within the flexprint strip may be programmed and tested, and batteries recharged, using a wired connection provided via contact fingers 203 on one end of the strip. The width of the strip is preferably greater than one-quarter wavelength of the two-way RF (radio frequency) link's operating frequency (e.g., 12.7 mm or one-half inch at 6 GHz). Batteries 204 are shown placed in back of the neck so as to be unobtrusive, although an alternative battery placement on the chest portion of the necklace may provide improved mechanical stability. Flat, flexible, rechargeable batteries may also be used instead of the "coin cell" type of batteries 204 shown. Elastomeric switches 207 may be used as input devices (e.g., on/off switches, volume and tone controls). The maximum neck opening width is comparable to the distance between the user's ears, enabling the necklace to lie flat across the user's shoulders. One pair of "bow tie" element "patch" antenna arrays 205 (which tend to radiate upward, perpendicular to the necklace) is positioned to be on the user's shoulders, so as to minimize the distance between an array and a corresponding earpiece when the user is looking forward. Types of elements other than bow tie elements may also be used (e.g., rectangular elements well known in the art). Another pair of arrays 206 is positioned to be on the user's chest, allowing a direct path between at least one antenna array and each earpiece when the user's head is turned. Many other antenna configurations are possible. If, for example, an earpiece antenna is positioned between the user's ear lobe and skull (i.e., a "Behind-The-Ear" design is used in which the antenna extends out the back of the case), then a necklace RPU antenna must be positioned at the back of the user's neck. In one preferred embodiment, the entire surface of a broad neck ribbon may be covered with patch, antenna elements that provide a large effective aperture, forming a steerable array for beamed power purposes.

In one preferred embodiment, a single flat, flexible rechargeable Lithium Ion Polymer battery measuring 180 mm (7.1 inches)×85 mm. (3.3 inches)×2.4 mm (0.1 inch) may be used to provide 1.55 ampere-hours at 3.7 volts. (see, e.g., units from Battery Engineering, Inc.). Such batteries can supply 350 milliwatts of continuous power for 16 hours, which is a typical daily wearing time, before requiring a recharge. An 80% efficient DC-to-DC, converter well known in the art (see, e.g., the Maxim MAX1626) can then be used to supply 280 milliwatts of continuous power to a radio frequency (RF) transmitter well known in the art (see, e.g., the Maxim MAX2240 or TriQuint TGA8286-EPU, having 35% efficiency, to provide a 100 milliwatt (+20 dBm, or 20 decibels relative to one milliwatt) RF transmitter power output level from the necklace RPU.

The gain of the necklace RPU antenna array is roughly given as 12.6 times the effective area divided by the square of the RF wavelength (see "One-Way Radar Equation/RF Propagation" in the "EW and Radar Systems Engineering Handbook. For an area of 100 square cm (15.5 square inches) and a wavelength of 5.1 cm (two inches), corresponding to a 6 GHz transmission frequency, the antenna array gain is a factor of 48.4, or 16.9 dBi (decibels relative to an isotropic antenna). Note that a 100 square cm area is less than that of the battery, which has an area of 153 square cm (23.4 square inches). Such an array area is easily achieved (and the array can be completely hidden under clothing) when flat antennas are worn over the user's shoulders, whereas it is impractical to achieve such an array area in a belt-worn RPU.

The resulting received power level, in dBm, at an isotropic antenna located 15.2 cm (6 inches) away from the RPU, at the earpiece, the transmitter power output in dBm plus the antenna gain in dBi minus the path loss in dB, where the path loss is approximately 32.45+(20)log[(6 GHz)(0.152 m)]= 31.6 dB. The resulting RF power level at the earpiece is approximately +5 dBm.

A +5 dBm RF power level, when applied to an RF detector diode used as a "virtual battery" (see, se.g., FIG. 12b in "Designing the Virtual Battery," Application Note 1088 is sufficient to produce 1.5 volts into a 1000 ohm load, or approximately 2.25 milliwatts. Once again assuming a DC-to-DC conversion efficiency of 80%, 1.8 milliwatts of continuous power can be produced by the "virtual battery" system for powering the earpiece. Such power levels are typical in hearing aids that provide compensation for mild hearing loss (see, e.g., the Siemens "Music" model 110/35/00, which requires one milliampere at 1.4 volts, or 1.4 milliwatts.

It should be noted that the preceding simplified analysis has been provided for illustration purposes only, and many details have been omitted. For example, larger array areas (e.g., corresponding to the 153 square cm size of the battery rather than the 100 square, cm suggested fin the preceding analysis) may be required to achieve a given gain due to antenna efficiency factors (e.g., mismatches and radiation losses). Also, while a 100 milliwatt. RF transmission power level has been assumed, higher power levels are possible (see, e.g. the 1 watt power levels available to spread spectrum transmitters operating in the 5.725–5.850 GHz band under 47 CFR Ch. 1, Para. 15.247 as described on p. 22 of OET Bulletin No. 63, "Understanding the FCC Regulations for Low-Power, Non-Licensed Transmitters"). In any case, precautions must be taken to ensure that RF transmissions cause no harm to the user (see OET Bulletin No. 56, "Questions and Answers about Biological Effects and Potential Hazards of Radiofrequency Electromagnetic Fields").

2. Collar. Although it is possible to wear a neck ribbon RPU (typically unsnapped) underneath a shirt collar, operation in this location may be impaired due to the fact that patch antennas typically radiate in a direction perpendicular to the surface of the flat RPU, which may cause radiation away from the earpiece. Such patch antennas are known in the art as "broadside" designs. To overcome this problem, any of a variety of flat antennas known in the art as "end-fired" designs may be used instead of patch antennas for the vertically-positioned shirt collar preferred embodiment. The Vivaldi antenna element well known in the art (see, e.g., Eric Thiele and Allen Taflove, "FD-TD Analysis of Vivaldi Flared Horn Antennas and Arrays," IEEE Transactions on Antennas and Propagation, Vol. 42, No. 5, May 1994, pp. 633–641) is a flat, end-fired antenna that provides a gain (e.g., 15 dBi) comparable to that of the patch antenna arrays described earlier. Athough the Vivaldi design provides a broad operating bandwidth, such bandwidth may not be necessary nor desirable for the present application. Other flat, end-fired antennas with narrower bandwidth well known in the art (e.g., tapered slot, "bunny ear," quarter-wave patch, Yagi-Uda and folded dipole), and even resonant antennas. may be used instead of the Vivaldi design. Note, however, that some flat, end-fired antenna elements require a quarter-wavelength (or more) distance above a ground plane (e.g., the user's neck) for proper operation. In some designs, this requirement may be mitigated through the use of anisotropic dielectric materials, well known in the art, between the antenna and ground plane to provide the required electrical distance within a smaller physical dimension.

This completes the description of the preferred embodiments of the invention. Those skilled in the art may recognize other equivalents to the specific embodiments described herein which equivalents are intended to be encompassed by the claims attached hereto.

What is claimed is:

1. An improvement in a wireless personal communication system having an earpiece suitable for being worn at the head of a user, and a processor unit,
   said earpiece having,
   a microphone responsive to a first sound from the environment, present at the input of said microphone, to provide a first electrical signal,
   a first wireless transmitter to provide a first wireless transmission in response to said first electrical signal,
   a first wireless receiver to receive a second wireless transmission to generate a second electrical signal, said second electrical signal being an enhanced version of said first electrical signal,
   a speaker transducer responsive to said, second electrical signal to convert said second electrical signal into a second sound;

said processor unit comprising a form fitting article worn about the neck of a user having,
- a second wireless receiver responsive to said first wireless transmission to provide a third electrical signal that is a replica of said first electrical signal,
- a signal processor responsive to said third electrical signal to provide a fourth electrical signal, said fourth electrical signal being an enhanced version of said third electrical signal,
- a second wireless transmitter responsive to said fourth electrical signal to provide said second wireless transmission of said fourth electrical signal, said second electrical signal being a replica of said fourth electrical signal.

2. Wireless personal communication system according to claim 1 wherein said wireless personal communication system is a hearing aid.

3. Wireless personal communication system according to claim 1 wherein said processor unit has a surface area in excess of six and one-half (6.5) square centimeters on the surface nearest said earpiece.

4. Wireless personal communication system according to claim 1 wherein said processor unit is a flexible printed circuit.

5. Wireless personal communication system according to claim 1 wherein said processor unit further includes secondary wireless link circuitry for wireless communication with devices other than said earpiece.

6. Wireless personal communication system according to claim 1 wherein said processor unit further includes circuitry to monitor vital signs of said user.

7. Wireless personal communication system according to claim 1 wherein said processor unit supplies an unmodulated wireless carrier to said earpiece for purposes of reflective communication from said earpiece.

8. Wireless personal communication system according to claim 1 wherein said processor unit supplies operating power to said earpiece by wireless means.

9. Wireless personal communication system according to claim 1 wherein said processor unit is a wearable computer.

10. Wireless personal communication system according to claim 1 wherein the said processor unit further includes at least one of a voice recognition circuit and a voice response circuit.

11. Wireless personal communication system according to claim 1 wherein the said wireless personal communication system is a wireless hearing apparatus providing,
- wireless bi-directional information on a user's body in close proximity.

12. A wireless hearing apparatus according to said claim 11 wherein said wireless bi-directional information is processed in a flat flexible device in the form of a necklace for wearing over a user's shoulders.

* * * * *